Patented May 3, 1932

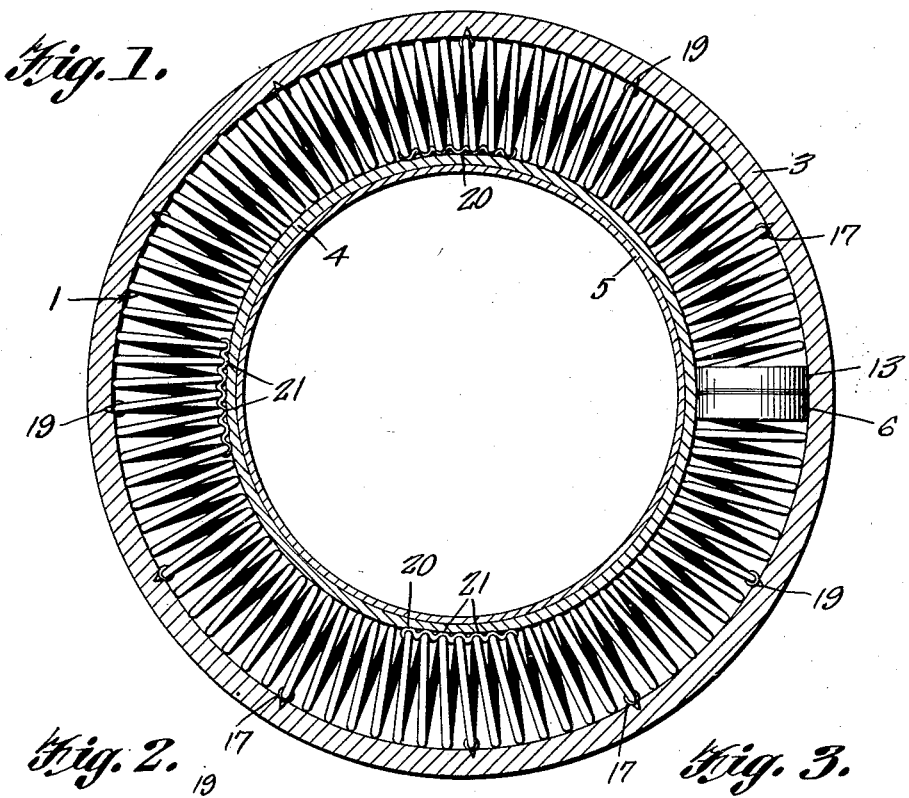
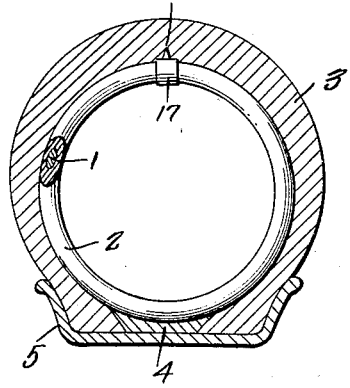
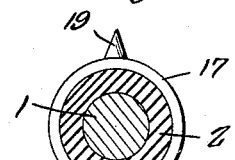
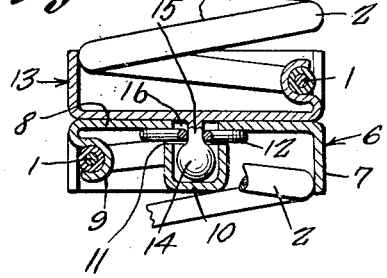

1,856,983

UNITED STATES PATENT OFFICE

AUGUSTIN BLÁZQUEZ, OF CENTRAL BAGUANOS, CUBA

VEHICLE TIRE

Application filed May 31, 1930. Serial No. 458,390.

This invention relates to tires for automobiles, motor cycles, and the wheels of other vehicles and more particularly to a filler of a resilient character to take the place of the ordinary inflatable inner tube. It is a well known fact that an inner tube presents numerous disadvantages in that it is liable to become punctured thus necessitating repairs requiring considerable time and labor, and, in the event of any fracture of the casing, is liable to suffer a blow-out with possibility of accident and the injuries resulting therefrom, and therefore the present invention has as its general object to provide a filling unit which may be arranged within the ordinary tire casing and which will possess none of the undesirable features and disadvantages of a pneumatic tube and which will at the same time possess the desired degree of resiliency so as to insure of even and smooth running of the vehicle, equipped therewith, over road surfaces.

Another object of the invention is to provide a resilient filler unit for tire casings embodying means to preclude any creeping of the unit within the casing or any distortion of the unit, even under severe strains due to high speed of travel or sudden application of brakes.

Another object of the invention is to provide a filler unit for pneumatic tire casings, to replace the inner tube, which unit may be manufactured and placed upon the market in the form of an elongate body, straight in form, so that the units may be more conveniently packed for shipment and stored for sale than if of annular form.

This invention also consists in certain other features of construction and in the combination and arrangement of the several parts, to be hereinafter more fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 1 is a vertical sectional view illustrating a tire casing in which the unit embodying the invention is arranged, the unit being shown in elevation.

Figure 2 is a detail vertical sectional view through the unit and casing, the view also illustrating the rim upon which the casing is mounted.

Figure 3 is a detail sectional view through one coil of the unit.

Figure 4 is a detail fragmentary view partly in section and partly in plane illustrating the means for connecting the ends of the unit so that the ends may be readily connected and separated.

The unit comprising the invention is in the nature of a helical spring of uniform diameter throughout its length, which spring is indicated in the drawings by the numeral 1 and is of course formed of steel wire. In order to prevent any frictional contact of the metallic coil with the inner surface of the tire casing, the helical coil is coated, throughout its entire length, with a coating 2 which is of soft rubber. The tire casing is indicated in the drawings by the numeral 3 and does not differ from the ordinary casing, and the numeral 4 indicates the usual filler strip which is placed between the beads at the inner side of the casing 3, and the rim upon which the casing is usually mounted is indicated by the numeral 5.

These parts are of course of the ordinary construction but, as above stated, the invention contemplates a filler for a pneumatic tire casing which will take the place of the ordinary tire and it will be observed by reference to Figures 1 and 2 of the drawings that the filler comprising the spring 1 and the coating 2 is to be arranged within the tire casing 3 in the same manner as is the ordinary pneumatic tube. In order to connect the ends of the unit, the unit is provided at one end of the coil, comprising the same, with a member 6 which is in the nature of a cylindrical cap including a rim 7 and a head 8 about which the rim extends, and the rim is struck in, at a point in its circumference, to provide an anchoring hook 9 for the end of the coiled cushioning unit, which is fitted into the head, this being shown most clearly in Figure 4. This member of the connecting device further comprises a socket member 10 which is integral with or secured to the inner side of the head 8 of the coupling member 6 and the socket member 10 of said member is formed with an opening 11 and a split ring 12 is mounted upon the socket member and seats in part in said opening 11 and is designed, by its resiliency to be normally closed. The other member which is mounted at the other end of the coil is indicated in general by the numeral 13 and is of the same construction as the member 6 except that instead of the socket 10, it is provided with a spherical head 14 connected by a neck 15 with the head of the member 13, centrally thereof.

The head 8 of the member 6 is provided with an opening 16 located axially thereof and this opening is of a diameter to permit of passage of the head 14 therethrough. These parts constitute the members of a snap fastener connection and it will be evident that in bringing the members 6 and 13 together, these component parts of the fastener will be mutually inter-locked and the filler body will then assume the annular form shown in Figure 1 of the drawings. At this point it will be understood that when the two ends of the unit are brought together, the ball and socket connection will serve to hold their ends in mutually inter-locked relation, and therefore the unit will assume the annular form adapting it to be fitted into the casing 3 and as the rim 5 is of the ordinary split type, it can be contracted and then permitted to expand so as to close the inner side of the casing 3.

In order to prevent creeping of the unit within the casing 3, split rings of a resilient metal, indicated by the numeral 17, are supplied to coils of the unit at equidistantly spaced points in the circumference thereof and each of these rings is so arranged that its split or open side 18 will be presented at the inner side of the respective coil and upon its opposite side, each ring is formed with a preferably conical piercing point or spur 19 and, in assembling the unit with the tire casing, these points or spurs will become embedded in the inner side of the tread portion of the casing as shown in Figures 1 and 2 of the drawings and serve the purposes stated.

In order to prevent the coils of the unit being spread apart by any foreign particles within the casing, such as small pebbles or the like, reinforcing elements 20 are arranged at the inner side of the unit at spaced points in the circumference thereof and each of these members is in the nature of a strip of resilient metal which is formed with a number of transverse corrugations indicated by the numeral 21 which are of a contour and dimensions to fit the inner sides of the coils of the unit against which the element is disposed, and it will be evident that alternate ones of the corrugations will accommodate the inner sides of the coils and the intermediate corrugations will lie between relatively adjacent ones of the coils at the inner sides thereof so as to prevent both spreading and crowding together of the coils.

What I claim is:—

1. A filler for tire casings comprising an annular body in the form of a helical spring, a coating of yieldable material covering the coils, and means, upon the outer turns of the coils of the body, engageable in the inner side of the tread portion of the casing, in which the body is installed, the said means comprising a split ring engaging about the respective coil, and a spur upon the outer side of the ring.

2. A filler for tire casings comprising an annular body, cup-shaped members secured to the ends of the body and having their bottoms opposed, one of the said bottoms having a socket therein and a split resilient ring extending into the socket, and a headed lug carried by the other member and extending into the socket for engagement by the split ring to detachably connect the ends of the body.

In testimony whereof I affix my signature.

AUGUSTIN BLÁZQUEZ.